United States Patent
Hofmann

(10) Patent No.: US 8,432,123 B2
(45) Date of Patent: Apr. 30, 2013

(54) METHOD AND ELECTRIC CIRCUIT FOR OPERATING AN ELECTRIC MOTOR, ESPECIALLY A SERVOMOTOR, FOR A COMPONENT OF AN INTERNAL COMBUSTION ENGINE

(75) Inventor: Michael-Juergen Hofmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 385 days.

(21) Appl. No.: 12/826,027

(22) Filed: Jun. 29, 2010

(65) Prior Publication Data

US 2011/0001452 A1  Jan. 6, 2011

(30) Foreign Application Priority Data

Jun. 30, 2009 (DE) .......................... 10 2009 027 346

(51) Int. Cl.
*H02P 23/00* (2006.01)
(52) U.S. Cl.
USPC ............... 318/799; 318/400.32; 318/400.33; 318/254; 318/432
(58) Field of Classification Search ................ 318/254, 318/254.1, 432, 701, 712, 799, 727, 807, 318/400.32, 400.33; 180/446
See application file for complete search history.

(56) References Cited

U.S. PATENT DOCUMENTS

| 5,057,759 | A | * | 10/1991 | Ueda et al. ..................... 318/616 |
| 5,489,831 | A | * | 2/1996 | Harris ........................... 318/701 |
| 5,565,752 | A | * | 10/1996 | Jansen et al. .................. 318/807 |
| 5,585,709 | A | * | 12/1996 | Jansen et al. .................. 318/807 |
| 5,903,128 | A | * | 5/1999 | Sakakibara et al. .......... 318/721 |
| 6,037,742 | A | * | 3/2000 | Rasmussen .................... 318/807 |
| 6,281,656 | B1 | * | 8/2001 | Masaki et al. ................ 318/700 |
| 6,727,673 | B2 | * | 4/2004 | Atmur ........................... 318/619 |
| 6,972,534 | B1 | * | 12/2005 | Schulz et al. ............ 318/400.02 |
| 7,064,513 | B2 | * | 6/2006 | Fenley .......................... 318/700 |
| 7,072,790 | B2 | * | 7/2006 | Hu et al. ....................... 702/147 |
| 7,548,035 | B2 | * | 6/2009 | Endo et al. .................... 318/432 |
| 7,577,545 | B2 | * | 8/2009 | Hu ................................ 702/151 |
| 7,579,795 | B2 | * | 8/2009 | Komatsu et al. ........... 318/254.1 |
| 7,911,333 | B2 | * | 3/2011 | Bussert et al. ................ 340/507 |
| 2003/0227274 | A1 | * | 12/2003 | Atmur ........................... 318/727 |
| 2005/0073279 | A1 | * | 4/2005 | Fenley .......................... 318/717 |
| 2006/0052972 | A1 | * | 3/2006 | Hu et al. ....................... 702/147 |
| 2006/0108967 | A1 | * | 5/2006 | Tanaka et al. ................. 318/712 |
| 2007/0040529 | A1 | * | 2/2007 | Takebayashi et al. ........ 318/685 |
| 2007/0090782 | A1 | * | 4/2007 | Endo et al. .................... 318/432 |
| 2007/0247092 | A1 | * | 10/2007 | Komatsu et al. .............. 318/254 |
| 2008/0204041 | A1 | * | 8/2008 | Anderson et al. ............. 324/629 |
| 2008/0300820 | A1 | * | 12/2008 | Hu ................................ 702/147 |
| 2009/0072986 | A1 | * | 3/2009 | Bussert et al. ................ 340/679 |
| 2009/0128074 | A1 | * | 5/2009 | Hu ............................ 318/400.33 |
| 2011/0062909 | A1 | * | 3/2011 | Patel et al. ............... 318/400.32 |
| 2011/0214934 | A1 | * | 9/2011 | Ueda et al. .................... 180/446 |

* cited by examiner

*Primary Examiner* — Paul Ip
(74) *Attorney, Agent, or Firm* — Kenyon & Kenyon LLP

(57) ABSTRACT

A method is described for operating an electric motor. The electric motor has at least two phases and a rotor. In the method, a current angular position (phipos) of the rotor is ascertained and, as a function of that, in at least one of the two phases, a potential is applied in such a way that a desired angular position (phiposreq) is achieved. From the current angular position (phipos) and the desired angular position (phiposreq) a setpoint angular velocity (dphides) is ascertained, which is used for influencing the potential.

13 Claims, 6 Drawing Sheets

| phipos | 0° | 5° | 10° | 15° | 20° | 25° | 30° | 35° | 40° | 45° | 50° | 55° |
|---|---|---|---|---|---|---|---|---|---|---|---|---|
| Activation No. | 0 | 1 | 2 | 3 | 4 | 5 | 6 | 7 | 8 | 9 | 10 | 11 |
| U | BAT | BAT | BAT | BAT | BAT | OPEN | GND | GND | GND | GND | GND | OPEN |
| V | GND | GND | GND | OPEN | BAT | BAT | BAT | BAT | BAT | OPEN | GND | GND |
| W | BAT | OPEN | GND | GND | GND | GND | GND | OPEN | BAT | BAT | BAT | BAT |
| H1 | low | high | high | high | low | low | low | high | high | high | low | low |
| H2 | low | low | low | high | high | high | low | low | low | high | high | high |
| H3 | high | high | low | low | low | high | high | high | low | low | low | high |
| Hall Nbr | 1 | 5 | 4 | 6 | 2 | 3 | 1 | 5 | 4 | 6 | 2 | 3 |
| HallOS | 0 | 0 | 0 | 0 | 0 | 0 | 1 | 1 | 1 | 1 | 1 | 1 |

Fig. 3

METHOD AND ELECTRIC CIRCUIT FOR OPERATING AN ELECTRIC MOTOR, ESPECIALLY A SERVOMOTOR, FOR A COMPONENT OF AN INTERNAL COMBUSTION ENGINE

RELATED APPLICATION INFORMATION

The present application claims priority to and the benefit of German patent application no. 10 2009 027 346.8, which was filed in Germany on Jun. 30, 2009, the disclosure of which is incorporated herein by reference.

FIELD OF THE INVENTION

The present invention relates to a method and an electric circuit for operating an electric motor.

BACKGROUND INFORMATION

It is understood that one may use multiphase electric motors for setting components of an internal combustion engine. Servomotors, for example, might be used for setting the blade angle of the blades of a turbocharger, or for setting the angular position of a throttle valve of an internal combustion engine.

For setting a desired angular position, one may apply to the electric motor specified potentials at the individual phases of same. The rotor of the electric motor then rotates to the desired angular position, and is also held there.

It is also understood, especially for achieving a rapid transition into the desired angular position, as well as for avoiding overshooting values during this transition, that one may provide regulation during this transition by which the potentials and currents on the individual phases are influenced. This may take place, for example by using a pulse width modulation.

It is an object of the exemplary embodiments and/or exemplary methods of the present invention further to improve the known methods for operating an electric motor, especially with regard to the transition into the desired angular position.

SUMMARY OF THE INVENTION

It is believed that the object may be attained by the exemplary embodiments and/or exemplary methods of the present invention by a method according to the disclosure and description herein, as well as by an electric circuit according to the disclosure and description herein.

The electric motor has at least two phases and one rotor. A current angular position of the rotor is ascertained, and as a function thereof, a potential is applied to at least one of the two phases in such a way that a desired angular position is achieved. From the current angular position and the desired angular position, a setpoint angular velocity is ascertained, which is used for influencing the potential.

That is, within the scope of this method, the angular positions are portrayed in angular velocities and the potential at least one phase of the electric motor is influenced as a function of these angular velocities. In this way, a more rapid and more accurate transition to the desired angular position is achieved.

It may be especially advantageous if, as a function of the setpoint angular velocity, that particular range or that particular ratio is set, in which the potential is present at the at least one phase of the electric motor. In this context, in particular, a pulse width modulation of the potential named may be used.

In one advantageous refinement, a setpoint/actual deviation is ascertained, based on the angular velocities ascertained. This bases the regulation of the exemplary embodiments and/or exemplary methods of the present invention on angular velocities, which leads to a substantially improved transition from the current angular position to the desired angular position.

Additional features, application options and advantages of the exemplary embodiments and/or exemplary methods of the present invention ensue from the following description of exemplary embodiments of the present invention, which are illustrated in the figures of the drawings. For this purpose, all of the described or illustrated features form the subject matter of the exemplary embodiments and/or exemplary methods of the present invention, either alone or in any combination, irrespective of their combination in the patent claims or their antecedent references, and also irrespective of their individual formulation and illustration in the description and in the drawings.

BRIEF DESCRIPTION OF THE DRAWINGS

FIG. 3 shows a table with conditions of the circuit and of the electric motor of FIG. 1.

DETAILED DESCRIPTION

Figure 1:
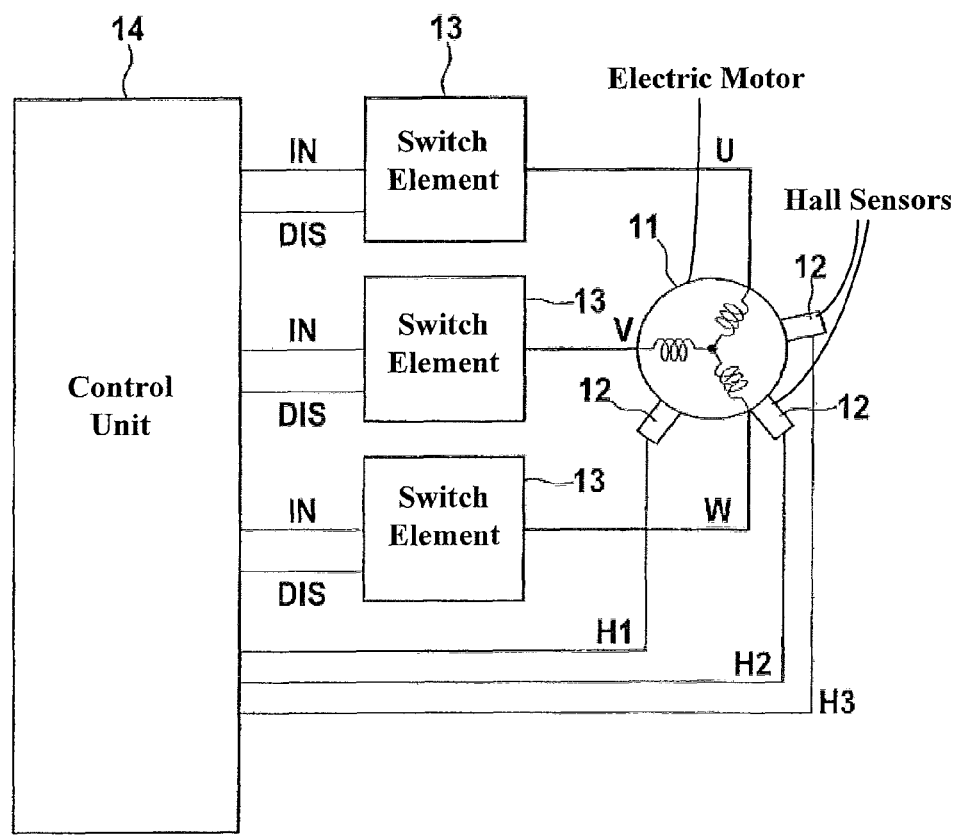
FIG. 1 shows a schematic block diagram of a circuit for operating an electric motor.

In FIG. 1 an electric circuit 10 is shown which has a three-phase electric motor 11. The phases of electric motor 11 are characterized by U, V, W. Electric motor 11 has a rotor that is not shown, and is further equipped with three Hall sensors 12 that are at a distance from one another, whose output signals are denoted as H1, H2 and H3.

Electric motor 11 may be a brushless DC motor, which is equipped, for example, with a 12-pole rotor magnet and a 24-pole sensor magnet for Hall sensor 12. Using this configuration, a resolution of the angular positions in the rotor magnet of 5 degrees may be achieved, using electric motor 11.

The voltage and the current of each of phases U, V, W is made available in each case by one switch element 13, which each have input signals IN, DIS supplied to them. These input signals IN, DIS are generated by a control unit 14, to which the output signals H1, H2, H3 of Hall sensor 12 are supplied, and which, in a manner not shown, has present at least one setpoint signal for a desired angular position of electric motor 11

Electric motor 11 may, for instance, be used in the internal combustion engine of a motor vehicle, namely, as a servomotor for any components of the internal combustion engine. For instance, electric motor 11 may be used to adjust a supercharger of the internal combustion engine. In this case, the setpoint signal for the desired angular position of the electric motor 11 may, for instance, be specified by an electronic fuel injector system of the motor vehicle.

Figure 2A:
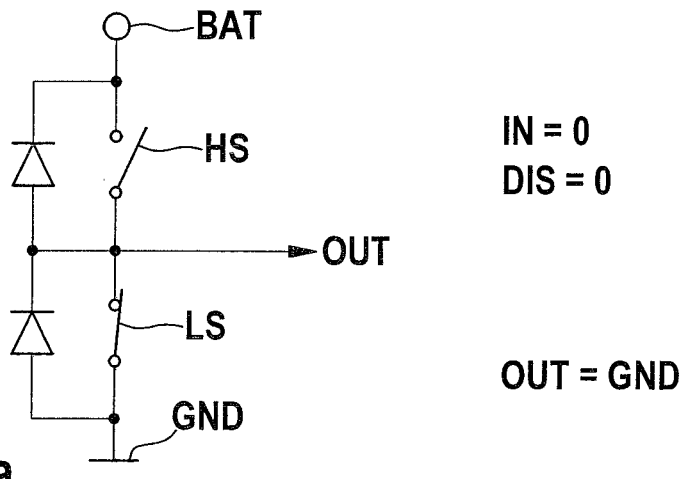
FIG. 2a shows an electric circuit diagram of a switch element of the circuit in FIG. 1.
Figure 2B:
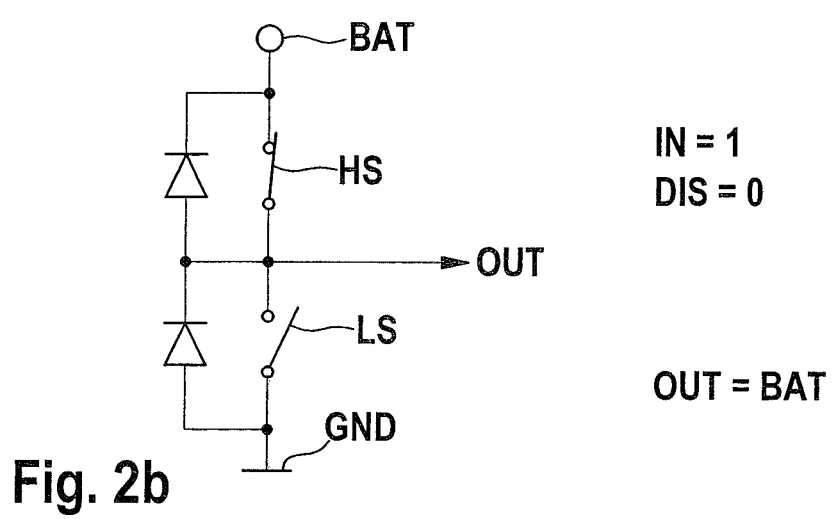
FIG. 2b shows another electric circuit diagram of a switch element of the circuit in FIG. 1.
Figure 2C:
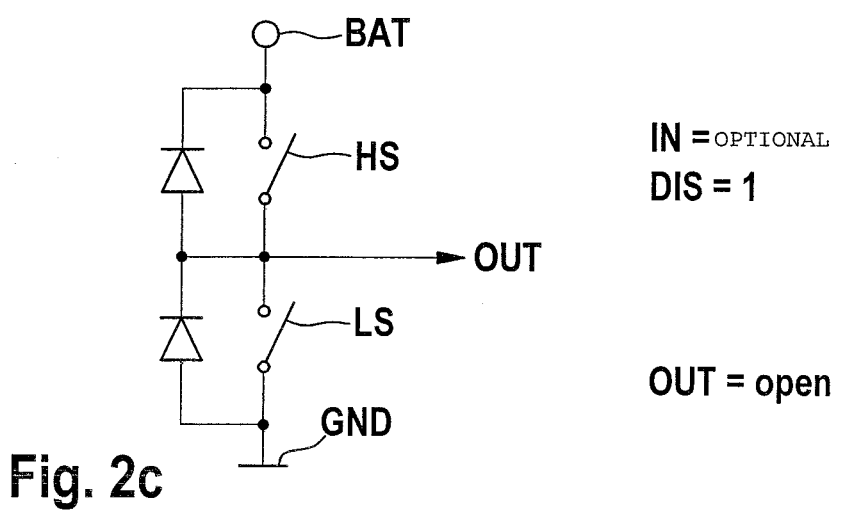
FIG. 2c shows another electric circuit diagram of a switch element of the circuit in FIG. 1.

In FIGS. 2a to 2c, one of the three switch elements 13 is shown in greater detail. It should be understood that the following explanations are valid for all three switch elements 13 of FIG. 1.

Switch element 13 has a series circuit of two electronic switches HS, LS, each having free-wheeling diodes connected in opposition. The two switches HS, LS, in this instance, are connected by a battery voltage BAT to ground GND. Between the two switches HS, LS, an output OUT is present.

The position of the two switches HS, LS is a function of input signals IN, DIS. In FIGS. 2a to 2c, the same switch element 13 is shown in each case, but based on different input signals IN, DIS. Input signals IN, DIS, in this instance, may have the states "0" or "low" (e.g. no voltage present) or "1" or "high" (e.g. voltage present).

In FIG. 2a, the following applies: IN=0, DIS=0. With this activation, switch HS is opened and switch LS is closed. With that, output OUT is at ground GND. In FIG. 2b, the following applies: IN=1, DIS=0. With this activation, switch HS is closed and switch LS is opened. In this case, battery voltage BAT is present at output OUT. In FIG. 2c, the following applies: IN=optional, DIS=1. With this activation both switches HS, LS are opened. Based on the two free-wheeling diodes, there is thus at output OUT a potential present that corresponds neither to battery voltage BAT nor to ground GND; this condition is designated as "open".

A rotational motion of the rotor magnet of electric motor 11 may be effected by applying certain specified potentials to the three phases U, V, W of electric motor 11. In this instance, in each case associated potential combinations for phases U, V, W are assigned to certain angular positions of electric motor 11. Using these potential combinations, electric motor 11 may be held also in the desired angular position.

In the table in FIG. 3, in the top line, twelve angular positions are entered in the horizontal direction. The separation of the twelve angular positions corresponds to the resolution of 5 degrees that was mentioned above. In total, the twelve angular positions cover an angular range of 0 degrees to 55 degrees, each inclusive. In the cell under the twelve angular positions, activation numbers "AnstNr" are given, by which the angular positions are consecutively numbered from the number "0" to the number "11".

In the third, fourth and fifth lines of the table of FIG. 3, for each of the twelve angular positions, there are entered respectively the associated potentials for the three phases U, V, W. As was mentioned before, three potentials for phases U, V, W, arranged one below the other, form a potential combination by which the rotor magnet of electric motor 11 may be rotated into the associated angular position and held there. Thus if, for example, in phase U the state "open" is generated, in phase V battery voltage BAT, and if the phase W is at ground GND, then angular position 25 "degrees" belongs to this potential combination.

In the sixth, seventh and eighth line of the table of the Figure, for each of the twelve angular positions the associated output signals H1, H2, H3 of the Hall sensors 12 are entered. The output signals H1, H2, H3, in this instance, may have states "1" or "high" (e.g. voltage present) and "0" or "low" (e.g. voltage not present). In each case three output signals H1, H2, H3, arranged one below the other, belong together, and form a Hall number "HallNr", which is shown in the last-but-one line of the table of FIG. 3. Each of the Hall numbers thereby characterizes one of the twelve possible angular positions.

In the present design of electric motor 11, there are only six Hall numbers for the twelve angular positions. In the table in FIG. 3 this is shown by the fact that Hall numbers "1" to "6" for the angular positions "0 degrees" to "25 degrees" and for angular positions "30 degrees" to "55 degrees" are the same. Thus, the Hall numbers by themselves are not in a position to distinguish uniquely the twelve angular positions.

This problem is solved as follows: After an initial switching on of circuit 10, output signals H1, H2, H3 are read in by control unit 14, and the two associated angular positions are read out from the table in FIG. 3. Let us assume that the following applies for output signals H1, H2, H3: H1=high, H2=high, H3=low. Angular positions "15 degrees" and "45 degrees" correspond to these output signals H1, H2, H3. Based on the unambiguity that was explained, but is not present, it is not clear in which angular position electric motor 11 is currently actually located. Electric motor 11 is therefore rotated into the angular position that is exactly between the two angular positions that were read out. In the current exemplary case, this is the angular position "30 degrees". Thus, phases U, V, W are acted upon by those potentials that belong to angular position "30 degrees" and activation number "6". After that, the rotor magnet of electric motor 11 rotates to this angular position of 30. That is, now the current actual angular position of electric motor 11 is known. This current angular position is stored in control unit 14.

Furthermore, a Hall-Offset "HallOS" is entered in the last line in the table in FIG. 3, using which it is then possible to distinguish from each other the two non-unique ranges of the angular positions of "0 degrees" to "25 degrees" and of "30 degrees" to "55 degrees". For example, a Hall-Offset of "0" is allocated to angular positions "0 degrees" to "25 degrees" and a Hall-Offset of "1" is allocated to angular positions "30 degrees" to "55 degrees".

In a subsequent operation of electric motor 11, output signals H1, H2, H3, which are supplied to control unit 14 with the aid of so-called interrupts, are continuously evaluated. A change in output signals H1, H2, H3 coming about in this context is interpreted as a rotational motion of electric motor 11, and is correspondingly also counted. The new current angular position of electric motor 11 is then stored in control unit 14, using output signals H1, H2, H3. With that, the respectively current actual angular position of electric motor 11 is unambiguously known at each point in time.

If another angular position is to be set in the operation of electric motor 11, phases U, V, W are acted upon by those potentials which belong to the other angular position. Let it be assumed, for example, that a reinforcement of the angular position of electric motor 11 is taking place from the above-mentioned "30 degrees" to "40 degrees", for instance, then the associated combination is read out from the table in FIG. 3 and applied to phases U, V, W of electric motor 11. The rotor magnet of electric motor 11 then rotates into the desired angular position.

The attainment of the desired angular position is checked by ascertaining the current angular position of electric motor 11, with the aid of output signals H1, H2, H3 of Hall sensors 13. If this current angular position agrees with the desired angular position, the rotor magnet of electric motor 11 has reached the desired angular position.

The transition of the rotor magnet from a current into a desired angular position is regulated in particular with the aim of carrying out the transition as rapidly as possible, and thereby substantially avoiding overshooting. For this purpose, input signal DIS is drawn upon. Thus, it was explained with reference to FIG. 2b that battery voltage BAT is present at output OUT when input signal IN=1 and input signal DIS=0. Starting from this state, input signal DIS may be influenced to the extent that it is alternatingly "0" and "1". For DIS=0, OUT=BAT comes about, as was mentioned, but for DIS=1, OUT=open, according to FIG. 2c. This influencing of input signal DIS thus has the result that battery voltage BAT is not continuously present at output OUT, but battery voltage BAT is present only to the extent that input signal DIS is equal to "0".

Figure 4:
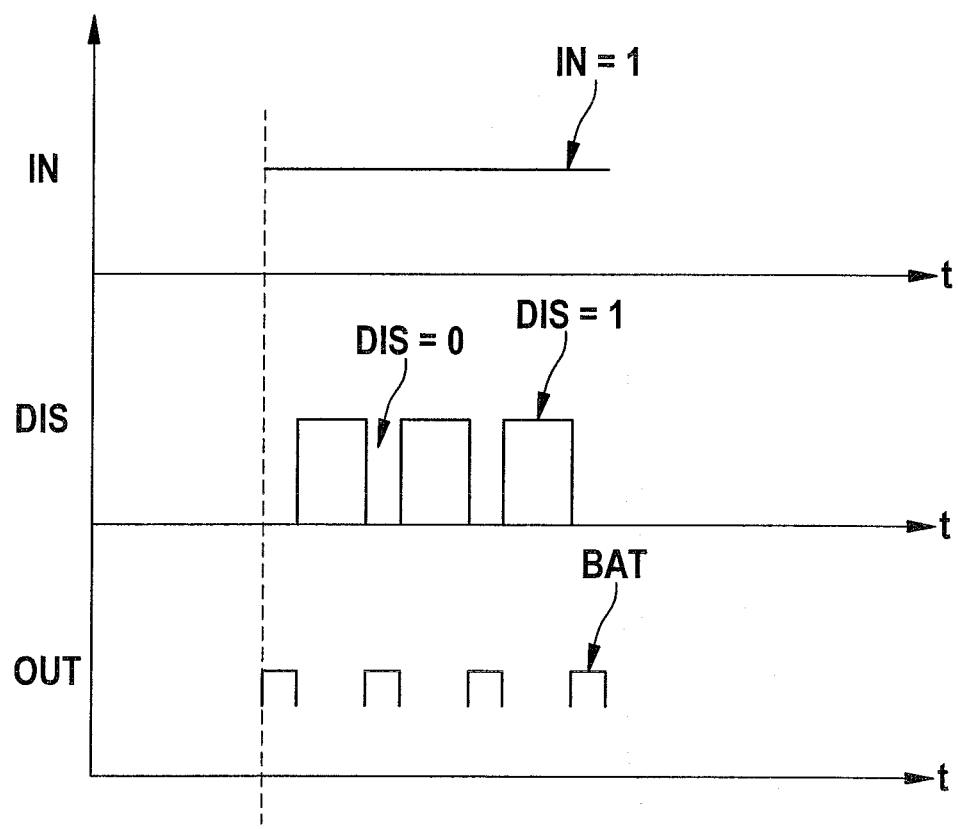
FIG. 4 shows a schematic time diagram of signals of the circuit of FIG. 1.

In FIG. 4, input signals IN, DIS and the potential at output OUT are plotted over time t. As was explained before, input signal IN is equal to "1", and input signal DIS is alternatingly "0" or "1". As was also explained, the result is that, at output OUT, battery voltage BAT is only present to the extent that input signal DIS is equal to "0". With the aid of a change in the ratio of the time durations during which input signal DIS is equal to "0" or "1", that extent is able to be set to which battery voltage BAT is to be present at output OUT. This represents a pulse width modulation of battery voltage BAT that is present at output OUT.

Figure 5:
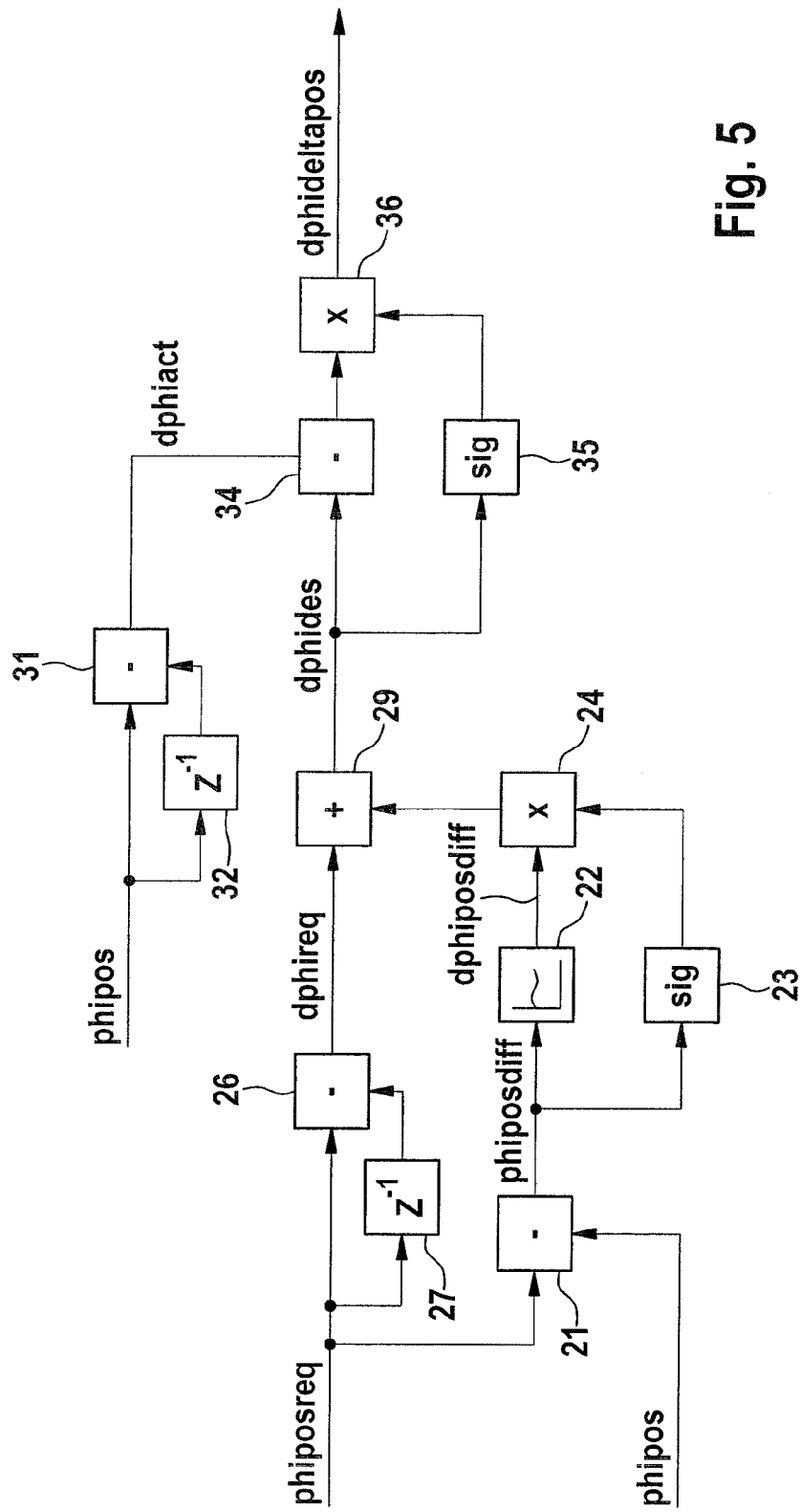
FIG. 5 shows a schematic block diagram of a method for operating the electric motor of FIG. 1.
Figure 6:
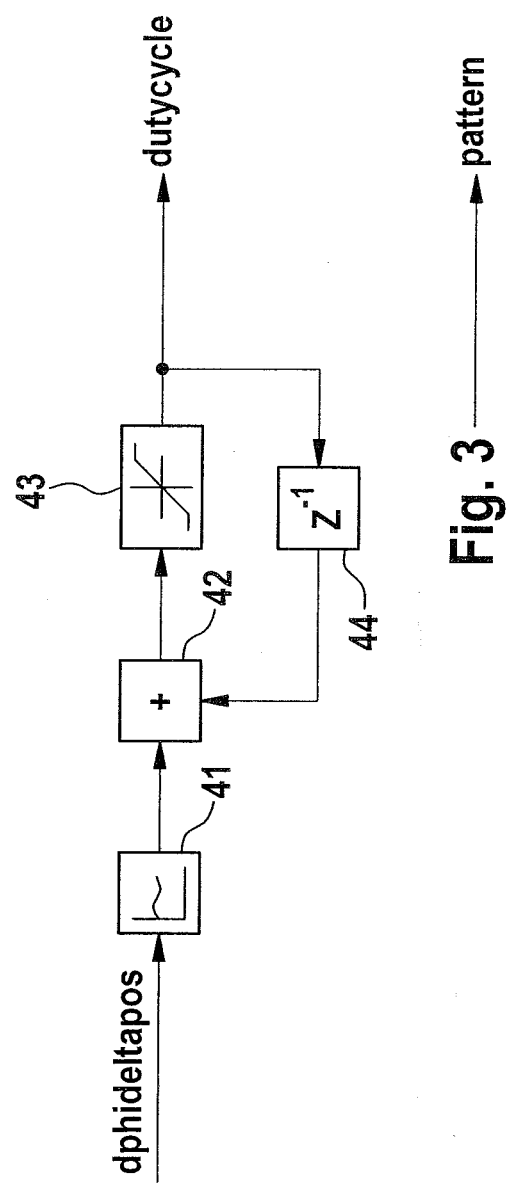
FIG. 6 shows another schematic block diagram of a method for operating the electric motor of FIG. 1.

FIGS. 5 and 6 show a method by which the abovementioned transition of the rotor magnet from a current to a desired angular position is able to be regulated. The method is may be carried out with the aid of a computer that is equipped with an appropriate computer program. The computer may be included in control unit 14.

The method of FIGS. 5 and 6 is run through at successive points in time. At each point in time the steps explained below are carried out, and appropriate input and output variables are read in or generated. To the extent required, the variables associated with a point in time are distinguished from one another by an index i. The index i refers to the current runthrough of the method, and an index i−1 has the meaning that a variable is involved that was ascertained in the last runthrough of the method.

A current angular position phipos and a desired angular position phiposreq are supplied to the method in FIG. 5 as input variables. The current angular position phipos, is that angular position of electric motor 11 which is given by the table of FIG. 3 from output signals H1, H2, H3 of Hall sensors 13. If output signals H1, H2, H3 currently, for example, have states "high", "low", "high", and if currently, for example, Hall-Offset "1" is present, the rotor magnet of electric motor 11 is located at an angular position of "35 degrees". Current angular position phipos is thus 35 degrees, in this case. In the desired angular position phiposreq, what is involved is the setpoint signal, mentioned at the outset, for a desired angular position of electric motor 11, or the desired angular position phiposreq is derived from this setpoint signal. In the current angular position phipos and the desired angular position phiposreq, known variables are thus involved.

The current angular position phipos and the desired angular position phiposreq are supplied to a block 21. For the output variable phiposdiff of block 21, the following equation applies:

$$\text{phiposdiff} = \text{phiposreq} - \text{phipos} \qquad (1)$$

Output variable phiposdiff represents an angular difference, and is supplied to a characteristic line 22 and to a signum function 23. Using the characteristic line, the angular difference phiposdiff is portrayed as an angular velocity dphiposdiff. Using signum function 23, the sign of the angular difference phiposdiff is taken into account. The output variables of characteristic line 22 and signum function 23 are supplied to a block 24, which multiplies these two output variables by each other.

With the aid of a block 26 and a time delay 27, to each of which the desired angular position phiposreq is supplied, the following equation applies:

$$\text{dphireq} = \text{phiposreq}(i) - \text{phiposreq}(i-1) \qquad (2)$$

Variable dphireq represents the angular velocity which comes about from the transition to the desired angular position phiposreq.

A subsequent block 29 links the variables ascertained so far according to the following equation:

$$\text{dphides} = \text{dphireq} + [\text{signum}(\text{phiposdiff}) * \text{dphiposdiff}] \qquad (3)$$

The variable dphides represents that setpoint angular velocity which, for the current angular position phipos and the desired angular position phiposreq, would make possible as good a transition as possible, within the meaning of the aims mentioned.

With the aid of a block 31 and a time delay 32, to each of which the current angular position phipos is supplied, the following equation applies:

$$\text{dphiact} = \text{phipos}(i) - \text{phipos}(i-1) \qquad (4)$$

Variable dphiact represents the angular velocity that is currently actually present.

Current angular velocity dphiact and setpoint angular velocity dphides are supplied to a block 34 which carries out a subtraction, and this represents the ascertainment of the setpoint/actual deviation of the method of FIG. 6, and with that, the explained regulation. Moreover, setpoint angular velocity dphides is supplied to a signum function 35, by which the sign of setpoint angular velocity dphides is taken into account.

A subsequent block 36 links the variables ascertained so far according to the following equation:

$$\text{dphideltapos} = \text{signum}(\text{dphides}) * [\text{dphiact} - \text{dphides}] \qquad (5)$$

The variable dphideltapos represents the difference of the angular velocity by which the current angular velocity phiact has to be changed in order to achieve the transition mentioned, that is as good as possible, to the desired angular position phiposreq.

In FIG. 6, the variable dphideltapos is supplied to a characteristic line 41, using which, the properties of that actuator are able to be taken into account which after all is being activated by the variable dphideltapos. In the present case, using characteristic line 41, one may undertake especially an adjustment to electric motor 11, and possibly to a preconnected driver circuit.

The output signal of characteristic line 41 is supplied to an addition block 42 and then to a limiting device 43. Limiting device 43 is provided for limiting the output signal of addition block 42 to a positive and a negative maximum value. The output signal of limiting device 43 is designated as a duty cycle. This variable duty cycle is supplied to addition block 42 via a time delay 44. There, the variable duty cycle and the variable dphideltapos are added. The variable duty cycle is thus fed back via time delay 44.

Using the variable duty cycle, the ratio of the time durations, in which the input signal DIS is equal to "0" and "1", is changed. Thus, with the aid of the variable duty cycle, that extent is set to which battery voltage BAT is present at output OUT. That is, the variable duty cycle represents that variable, using which, the pulse width modulation mentioned, of the battery voltage BAT present at output OUT, is influenced.

Furthermore, according to FIG. 6, a variable pattern is also made available. This variable pattern represents those voltages of phases U, V, W which have to be set for a desired angular position of electric motor 11 according to FIG. 3. The variable pattern may change, in this instance, either sequentially corresponding to the table in FIG. 3, that is, always in steps of 5 degrees. But it is alternatively also possible that the variable pattern changes using a larger step size. This may be the case, for example, when the desired angular position is at a distance of more than 15 degrees from the current angular position.

Consequently, the method of FIGS. 5 and 6 generates the variable duty cycle and the variable pattern. The variable duty cycle sets the extent to which the battery voltage BAT is present at output OUT, and the variable pattern gives those phases U, V, W which are activated using battery voltage BAT. These phases and the abovementioned extent of the battery voltage is then the deciding factor as to how the transition of the rotor magnet of electric motor 11 is carried out from the current angular position phipos to the desired angular position phiposreq. The current angular position phipos is measured via Hall sensors 13, and thus it represents the feedback loop of the regulation explained.

Consequently, using the methods of FIGS. 5 and 6, the angular position of the electric motor 11 within a specified angular range may be regulated by a pulse width modulation of the potential present at least one of phases U, V, W of electric motor 11. Within the scope of this regulation, the angular positions are portrayed as angular velocities, and the setpoint/actual deviation of the regulation is carried out based on the angular velocities ascertained.

If the current angular position deviates only slightly from the desired angular position, by less than 15 degrees, for instance, it is possible that the variable pattern is maintained unchanged, and that only the variable duty cycle is changed. With that, the rotor magnet of electric motor 11 is able to be set exactly to the desired angular position and then kept at that point.

What is claimed is:

1. A method for operating an electric motor having at least two phases and a rotor, the method comprising:
    ascertaining, by a control unit of an electric circuit, a current angular position of the rotor;
    determining a potential required to achieve a desired angular position of the rotor, wherein the potential is determined by the control unit as a function of the current angular position, in at least one of the two phases;
    applying, via output of the control unit, the potential to the electric motor;
    ascertaining, by the control unit, a setpoint angular velocity from the current angular position and the desired angular position; and
    influencing the potential by using the setpoint angular velocity to adjust the control unit output.

2. The method of claim 1, further comprising:
    setting, as a function of the setpoint angular velocity, an extent or a ratio at which the potential is present at the at least one phase of the electric motor.

3. The method of claim 1, wherein a desired angular velocity is ascertained from the desired angular position using a time delay.

4. The method of claim 1, wherein an angular difference is formed from the current angular position and the desired angular position and the control unit accesses a characteristic map, from which an angular velocity is ascertained as a function of the angular difference.

5. The method of claim 4, wherein the setpoint angular velocity is derived from the desired angular velocity and the angular velocity ascertained from the characteristic map.

6. The method of claim 1, wherein a current angular velocity is ascertained from the current angular position using a time delay.

7. The method of claim 6, wherein a setpoint/actual deviation is ascertained from the current angular velocity and the setpoint angular velocity.

8. The method of claim 7, wherein the setpoint/actual deviation influences the potential of at least one of the phases of the electric motor through a pulse width modulation of the control unit output.

9. The method of claim 8, wherein the setpoint/actual deviation is fed back, via a time delay, into a feedback loop that implements the pulse width modulation by varying a duty cycle of the control unit output based on the setpoint/actual deviation that is fed back.

10. A computer readable storage medium having a computer program, which is executable by a processor of a control unit, the computer program including instructions which, when executed, cause the processor to perform a method for operating an electric motor having at least two phases and a rotor, the method comprising:
    ascertaining, by the processor, a current angular position of the rotor;
    determining a potential required to achieve a desired angular position of the rotor, wherein the potential is determined by the processor as a function of the current angular position, in at least one of the two phases;
    applying, via output of the control unit, the potential to the electric motor;
    ascertaining, by the processor, a setpoint angular velocity from the current angular position and the desired angular position; and
    influencing the potential by using the setpoint angular velocity to adjust the control unit output.

11. A control unit, comprising:
    a computer processor;
    a computer readable storage medium having a computer program including instructions, which when executed by the processor, cause the processor to perform a method for operating an electric motor having at least two phases and a rotor, the method including:
    ascertaining, by the processor, a current angular position of the rotor;
    determining a potential required to achieve a desired angular position of the rotor, wherein the potential is determined by the processor as a function of the current angular position, in at least one of the two phases;
    applying, via output of the control unit, the potential to the electric motor;
    ascertaining, by the processor, a setpoint angular velocity from the current angular position and the desired angular position; and
    influencing the potential by using the setpoint angular velocity to adjust the control unit output.

12. An electric circuit for a motor vehicle, comprising:
    a control unit, including a computer readable storage medium having a computer program including instructions, which when executed by a processor of the control unit, cause the processor to perform a method for operating an electric motor having at least two phases and a rotor, the method comprising:
    ascertaining, by the processor, a current angular position of the rotor;
    determining a potential required to achieve a desired angular position of the rotor, wherein the potential is determined by the processor as a function of the current angular position, in at least one of the two phases;

applying, via output of the control unit, the potential to the electric motor;

ascertaining, by the processor, a setpoint angular velocity from the current angular position and the desired angular position; and influencing the potential by using the setpoint angular velocity to adjust the control unit output.

13. The electric circuit of claim 12, wherein the electric motor is configured as a servomotor for adjusting a supercharger of an internal combustion engine of the motor vehicle.

* * * * *